United States Patent [19]
Kleineberg et al.

[11] Patent Number: 4,667,920
[45] Date of Patent: May 26, 1987

[54] ELASTIC SUPPORT ARRANGEMENT FOR A VEHICLE FUEL PUMP OR THE LIKE

[75] Inventors: Wolfgang Kleineberg, Wendlingen; Alfons Ziegelbauer, Stuttgart; Harald Boehringer, Neuhausen; Manfred Stotz, Aichwald, all of Fed. Rep. of Germany

[73] Assignee: Daimler-Benz Aktiengesellschaft, Fed. Rep. of Germany

[21] Appl. No.: 787,074

[22] Filed: Oct. 15, 1985

[30] Foreign Application Priority Data

Oct. 12, 1984 [DE] Fed. Rep. of Germany ....... 3437431

[51] Int. Cl.$^4$ .................. F16M 13/00; F16L 3/22
[52] U.S. Cl. .................. 248/610; 248/638; 248/68.1; 248/60
[58] Field of Search .................. 248/610, 611, 638, 60, 248/613, 68.1

[56] References Cited

U.S. PATENT DOCUMENTS

| | | |
|---|---|---|
| 1,573,175 | 2/1926 | Lewis et al. ............... 248/610 X |
| 2,160,808 | 6/1939 | Bradley ..................... 248/610 X |
| 2,291,148 | 7/1942 | Carson ...................... 248/610 X |
| 3,650,545 | 3/1972 | Freed ........................ 248/610 X |
| 3,941,412 | 3/1976 | Carpenter ................. 248/60 X |
| 4,550,795 | 11/1985 | Teshima ................... 248/60 X |

Primary Examiner—Ramon S. Britts
Assistant Examiner—Karen J. Chotkowski
Attorney, Agent, or Firm—Barnes & Thornburg

[57] ABSTRACT

An elastic support system is disclosed for a fuel system of motor vehicles of the type equipped with a mixture-compressing internal-combustion engine and an electrically driven fuel pump, a fuel filter and an accumulator, in which case at least the fuel pump is to be arranged in proximity of the tank at the underbody. A roller vane pump is used as the fuel pump which operates with heavy pulsations and therefore, in addition to its mechanically caused operating noises, also generates pulsation noises. It therefore must be disconnected or isolated from the underbody with respect to vibrations. For this purpose, it is suggested by the invention to provide, between the fuel pump and a suspension member fastened at the underbody of the motor vehicle, a connecting element that is held at the fuel pump and can be suspended at the suspension member. The connecting element consists exclusively of rubber-elastic material and at least in the area between the fuel pump and the suspension member exhibits a low spring rate. The soft development of the connecting element ensures an effective disconnection of vibrations between the fuel pump and the underbody of the motor vehicle during use of the system.

17 Claims, 6 Drawing Figures

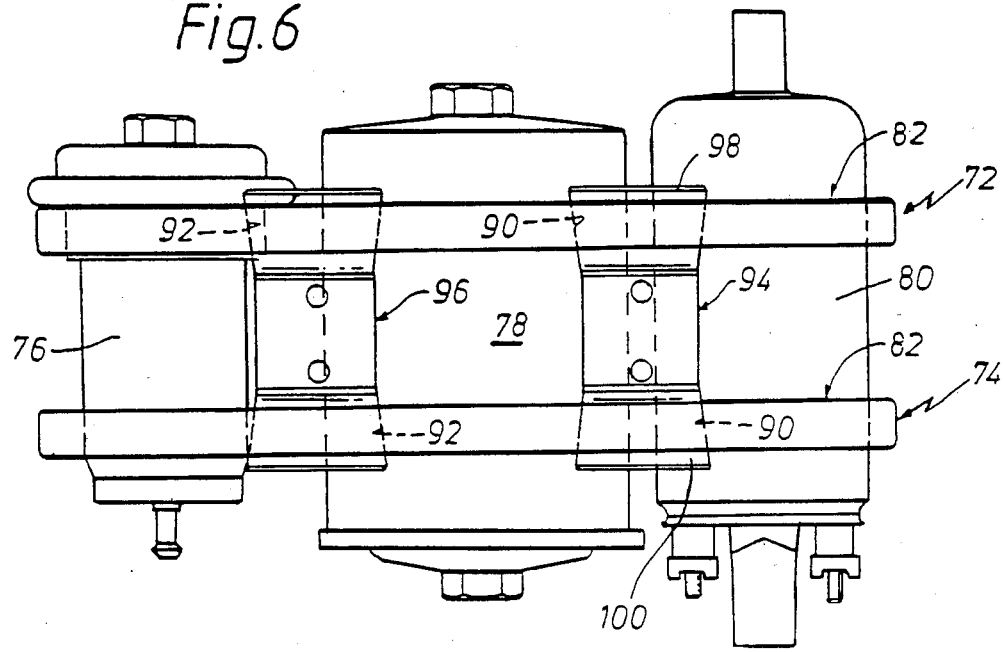

ELASTIC SUPPORT ARRANGEMENT FOR A VEHICLE FUEL PUMP OR THE LIKE

BACKGROUND AND SUMMARY OF THE INVENTION

This invention relates to an elastic suspension arrangement for an electric fuel pump and/or a fuel filter and/or an accumulator that are part of the fuel system of motor vehicles. Particularly preferred embodiments relate to such suspension arrangements for passenger cars equipped with a mixture-compressing internal-combustion engine. Such elastic suspension arrangements have been contemplated which included portions which are rubber-elastic between the part being suspended and the suspension member.

In previously contemplated arrangements, the fuel pump, the fuel filter and the accumulator are firmly combined with one another to form an oblong constructional unit. At this constructional unit, at its ends that are opposite one another, one rubber - metal element respectively is fastened by means of which it can swingably be fastened on holding means provided at the bottom side of the underbody of a vehicle. By means of the rubber - metal elements it is to be ensured that the constructional unit, because of the fuel pump that is designed as a roller vane pump and therefore pulsates heavily, is disconnected from the underbody with respect to vibrations in order not to let pulsation noises and mechanically created noises of the pump reach the interior of the vehicle as structure-borne noise, where, because of their high frequency they would be found to be unpleasant.

The disconnection or uncoupling of vibrations carried out by means of the rubber metal elements has proven to be unsatisfactory because the natural frequency of the constructional unit was too close to the exiting frequency of the fuel pump. The cause in this case is the fact that the rubber - metal elements consist of a rubber-elastic connecting member and a metal plate vulcanized to it having threaded bolts as the suspension members.

Because of a required good adhesive connection between the connecting member consisting of rubber and the metal plate, the shore hardness of the rubber, however, can only be reduced to a certain value, or the elasticity rate can only be reduced insufficiently. In addition, the rubber - metal connection, in the case of rubber - metal elements, was often made incorrectly which frequently results in the replacement of such a suspension device.

Finally, during the mounting of the constructuional unit, installation difficulties occur frequently, caused by the tolerances in the mutual assignment of the threaded bores on the vehicle body to the anchoring of the threaded bolts of the metal plates. Thus the elastic connecting members of the rubber - metal elements are pulled, upset or twisted within themselves causing a hardening of the rubber mass of the connecting members.

This invention is based on the objective of providing a suspension device of the above-described general type by means of which an effective vibratory disconnection can be achieved between the fuel pump and/or the accumulator and the underbody of the motor vehicle. In preferred embodiments, the suspension device should be easy to manufacture and, irrespective of existing manufacturing tolerances between the fastening points on the vehicle body, should be easy to mount. Also, on the parts to be suspended, holding means to be provided for the purpose of their suspension at the connecting member should not be necessary.

These objectives are achieved according to the invention by providing that the connecting member includes rubber-elastic material with an opening therethrough accommodating a prestress fit over a housing of the part being suspended. In especially preferred embodiments the connecting member consists of the rubber-elastic material.

In the case of the construction according to the invention, the connecting element and the suspension member of the suspension device form two constructional parts that are first separate from one another, the suspension member of which must be fastened separately at the underbody of the vehicle. The connecting element, for the swingable suspension of one or several parts of the fuel system, must only be fitted on the housing of the part and fastened at the suspension member. In preferred embodiments the suspension member is connected to the rubber-elastic connecting element by hooking into the same.

The suspension according to the invention also ensures increased safety in the area of the suspension in the case of an accident where a deformation of the body occurs because the at least one elastically suspended part of the fuel system, because of the soft formation of the connecting element, can yield to deforming parts of the vehicle body.

Synthetic and natural polymers having a rubber-elastic behavior (synthetics or caoutchouc) and rubber are suitable for making the connecting member. In certain preferred embodiments of the invention the opening walls of the rubber-elastic connecting member closely surround the whole circumference of the housing of the fuel system part being suspended. In this case, it is advantageous to further develop the connecting element according to preferred embodiments of the invention by providing that the same has a low spring rate and/or includes a slot shaped recess to thereby improve the elastic soft support of the part being suspended.

The low rate of elasticity or the soft formation of the connecting element result in a strong yielding and thus in the endeavored good disconnection or isolatio of vibrations, in which case its elasticity also makes possible an advantageous adaptation to a production-caused offset of the suspension member at the underbody of the vehicle.

In especially preferred embodiments, the low rate of elasticity of the connecting element can only be achieved by the fact that the development of the suspension member and of the connecting element can be separated from one another, making a vulcanized connection superfluous. This makes it possible to select the softness of the rubber-elastic material for the connecting element to be very high.

The fastening of the connecting element at the suspension member is advantageously achieved according to certain preferred embodiments by providing the connecting element with a slot shaped recess which is fitted on a hook shaped part of the suspension member.

The swingable suspension of the fuel pump or the other parts belonging to the fuel system at the underbody of the vehicle can be carried in the latter case, it is advantageous to develop the connecting elements as disk or donut shaped rubber-elastic elements which surround the housing part being supported at spaced apart locations. Preferably a single suspension member with opposite facing anchoring parts engage in recesses of the respective rubber elastic elements.

Further objects, features, and advantages of the present invention will become more apparent from the following description when taken with the accompanying drawings(s) which show, for purposes of illustration only, several embodiments in accordance with the present invention.

BRIEF DESCRIPTION OF THE DRAWINGS

FIG. 6 is a top view of the arrangement according to FIG. 5.

DETAILED DESCRIPTION OF THE DRAWINGS

Figure 1:
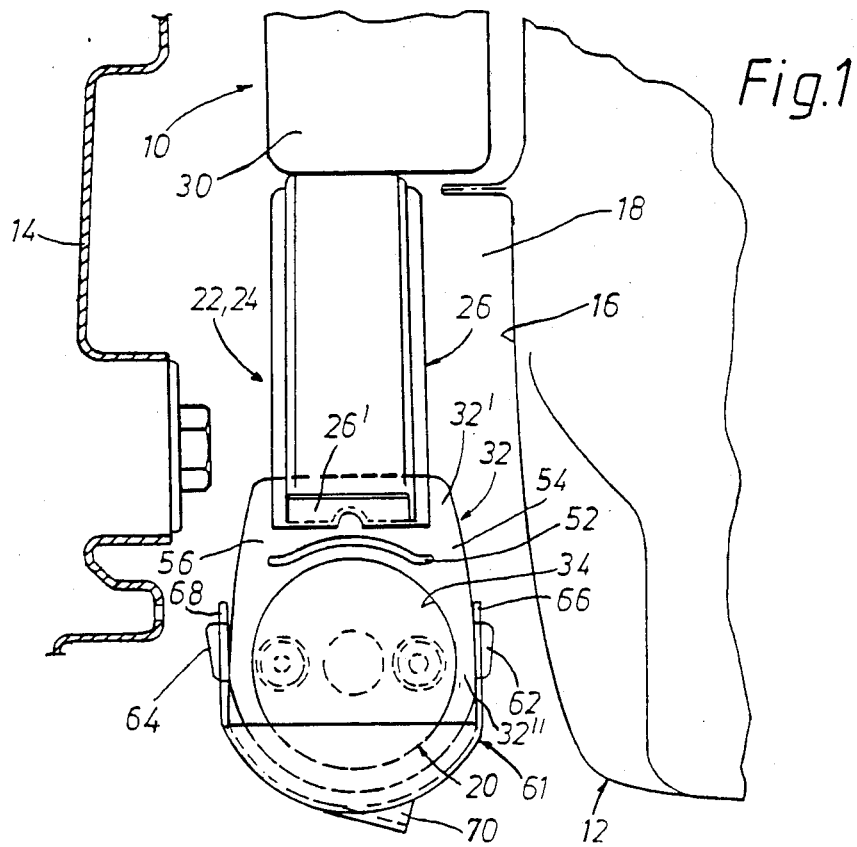
FIG. 1 is a front schematic view of an electric fuel pump that is swingably suspended at the underbody of a vehicle body, next to a fuel tank, by means of an elastic suspension constructed in accordance with a first preferred embodiment of the present invention.
Figure 2:
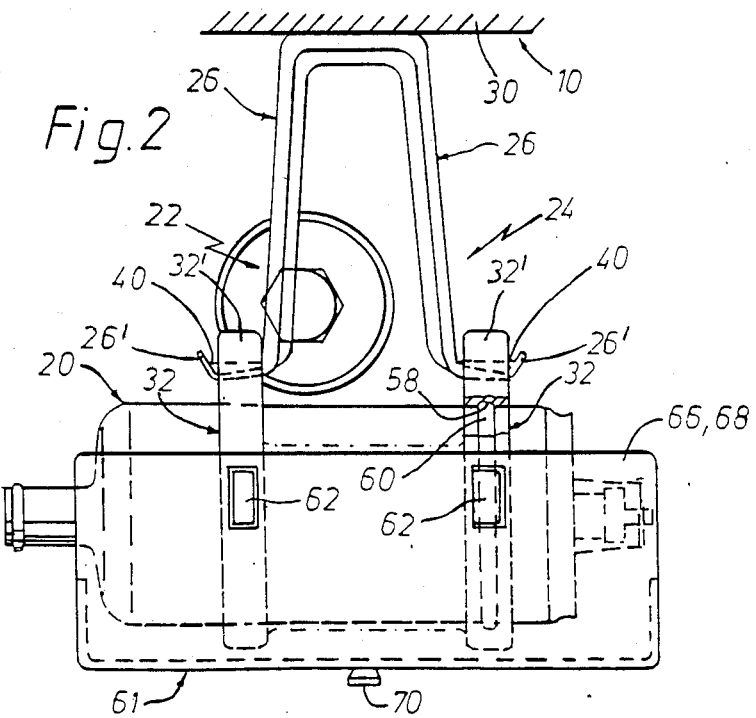
FIG. 2 is a lateral view of the arrangement of FIG. 1.

In FIGS. 1 and 2, reference number 10 refers to a part of an underbody of a passenger car from which the fuel tank 12 projects in downward direction. A rear-axle support part 14 extends in downward direction, which support part together withone side wall 16 of the tank, forms a shaft-type space 18. In space 18, an electric fuel pump 20 is swingably suspended by means of an elastic suspension constructed according to the invention in such a way that the pulsation and running noises generated by the fuel pump are effectively disconnected with respect to the underbody 10.

The fuel pump 20, in addition to other parts that are not shown in detail in FIGS. 1 and 2, such as the fuel filter and the accumulator, is part of a fuel system of a passenger car equipped with an Otto injection engine. The fuel filter and the accumulator in this case are also either individually or jointly, analogously to the fuel pump 20, suspended in a rubber-elastic manner for example by means of two suspension devices 22 and 24. Both suspension devices have the same construction.

The suspension devices are formed by a suspension member 26 that can preferably be fastened by being screwed onto an underbody part 30 of the motor vehicle and by a connecting element 32 consisting exclusively of a rubber-elastic material, preferably rubber, which for the holding of the fuel pump 20 is equipped with a receiving opening 34 adapted to the circumferential shape of the part to be held.

Figure 3:
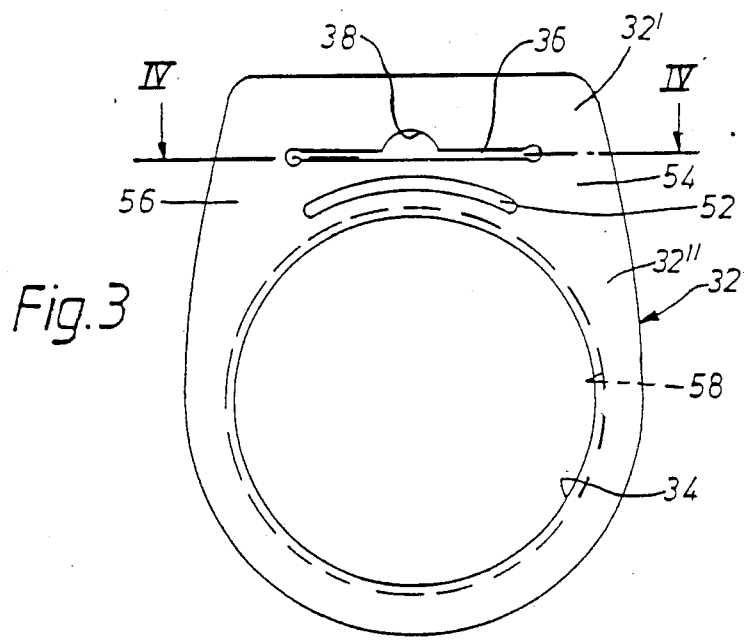
FIG. 3 is a front view of one of the elastic connecting elements of the suspension of FIGS. 1 and 2.

As shown in FIG. 2, the two connecting elements 32 are disposed on the housing shell of the fuel pump 20 and enclose it while being prestressed. Elements 32 are also suspended at one of the suspension members 26 respectively. For this purpose elements 32, as shown in FIG. 3, have a hooking slot 36 extending in a horizontal plane and disposed at a radial distance above their receiving opening 34, by means of which slot 36 they can be fitted on an end piece of the suspension member 26 that has the shape of a hook and forms an anchoring part 26'. In other contemplated embodiments, the connecting elements 32, laterally to the fuel pump 20, may in each case also be equipped with especially slot-shaped suspension recesses respectively.

So that a damaging of the rubber of the connecting elements 32 cannot take place in the edge areas of the hook-shaped anchoring parts 26' during vibratory movements because of friction, the hooking slot 36 for the centering of the anchoring part 26' is advantageously equipped with a sector-shaped indentation 38 into which a central web 40 engages ina form-locking manner, the web 40 being formed by a raised bead impressed into the anchoring member 26'.

Figure 4:
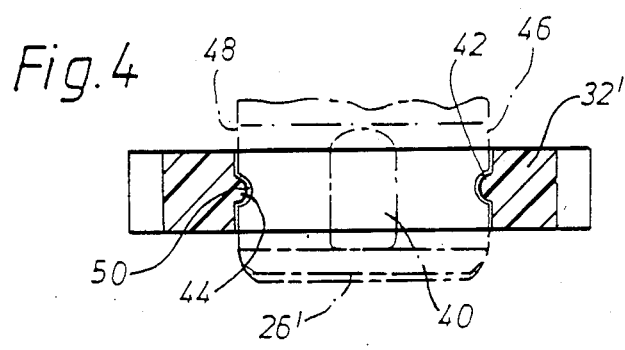
FIG. 4 is a sectional through one of the connecting elements of FIGS. 1-3, taken along the line IV—IV of FIG. 3.

As shown in FIG. 4, the hooking slot 36 is advantageously in each case also equipped at its lateral end with a central projection 42 and 44 that projects into the slot and is preferably semicircular, an edge deepening 40 respectively being assigned to said projection at the lateral edge 46 and 48 of the anchoring part 26' adjacent to it. The web 40 as well as the projections 42 and 44 ensure that the connecting element 32, with its upper section 32' fitted onto the anchoring part 26', cannot shift in axial direction of the receiving opening 34 nor transversely to it. In addition, the projections 42 and 44 are preferably dimensioned in such a way that only the lateral edges 46 and 48 of the anchoring part 26' are in contact with them.

As shown in FIG. 2, the suspension members 26 are arranged symmetrically with respect to one another in such a way that they reach between the two connecting elements 32 and, by means of their anchoring parts 26', reach through their respective hooking slots 36. Advantageously, in the case of a relatively small mutual distance of the connecting elements 32, the suspension members 26 are therefore formed by a joint constructional part in the shape of a stirrup, the legs of which form the suspension members 26.

The disk-shaped connecting elements 32 advantageously consist of rubber, in which case, in the area of their hooking slot they may be designed to be relatively stiff in order to prevent a detaching from anchoring part 26'. In addition, at least between their receiving opening 34 and the hooking slot 36, they are developed to be very soft, for which purpose, at least in this area, they have a correspondingly low rate of elasticity. This endeavored extensive flexibility is also supported by the arrangement of another slot 52 provided between the receiving opening 34 and the hooking slot 36, by means of which only the web parts 54 and 46 remain between the upper section 32' having the hooking slot 36, and the lower section 32" of the connecting element. However embodiments are also contemplated where the connecting elements 32 as a whole consist of an elastomer with a correspondingly low rate of elasticity with the thickness dimensions of the disk-shaped connecting elements 32 selected correspondingly.

As shown in FIG. 2, at least one connecting element 32, at the circumference of its receiving openings 34, is equipped with an inner circumferential groove 58 into which, in a form-fitting manner, an outside bead 60, that is obligatorily provided on series-produced fuel pumps 20, engages at the circumference of its shell and as a result provides a reliable axial securing of both parts.

It is advantageous to use the two connecting elements 32 at the same time for the fastening of a trough-shaped container which partially houses the fuel pump 20, covers it from below and forms a protective cap 61. For this purpose, both connecting elements 32, at opposite circumferential parts, are preferabl equipped with on projection 62 and 64 respectively, while corresponding openings are provided in the longitudinal walls 66 and 68 of the protective cap 61, the projections 62 and 64 being able to engage in said openings in a form-fitting manner. In the same manner, grooves or one groove and a projection may be provided at the circumference of the connecting elements 32 so that they are opposite one another and can be engaged with corresponding openings or projections of the protective cap 61 according to other contemplated embodiments. The number 70 refers to a discharge opening on the underside of the protective cap 61 from where spraying water reaching the protective cap 61 may drain out.

As outlined in FIG. 2 in a dash-dotted manner, the holding of the fuel pump 20 may be carried out also with only one single suspension device. In this case, the connecting element preferably forms a hollow cylinder which, according to FIG. 2, at the upper shell parts at a distance from one another, is equipped with two parallel projection pieces corresponding to the mutual assignment of the two sections 32' of the connecting elements 32. For th purpose of the elastic suspension of the fuel pump 20, the suspension member could, for example, have the stirrup shape shown in FIG. 2.

Figure 5:
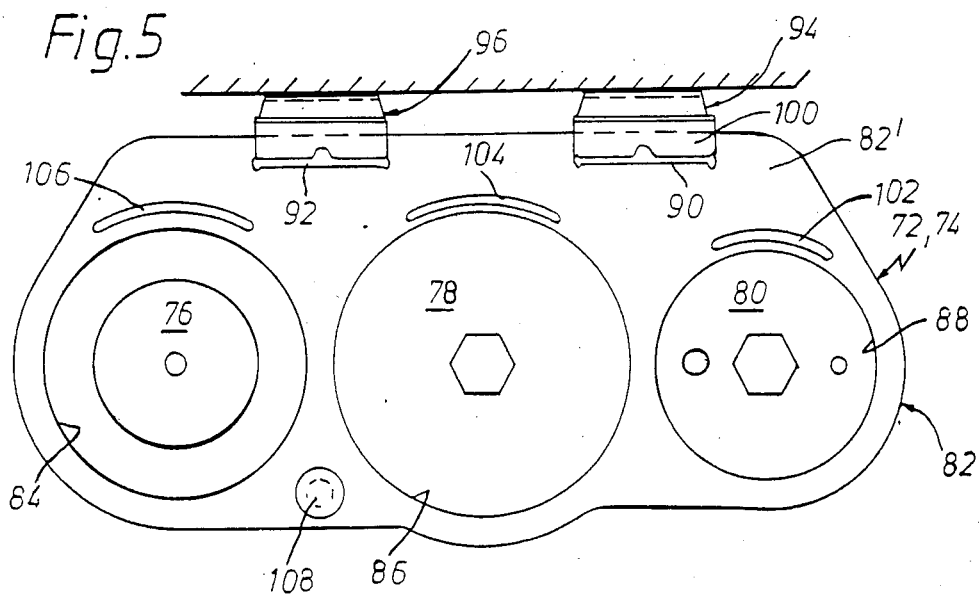
FIG. 5 is a front schematic view of a swingable suspension for a constructional unit including an electric fuel pump, a fuel filter and an accumulator, constructed in accordance with another preferred embodiment of the invention.

FIGS. 5 and 6 show a modification of the suspension devices shown in FIGS. 1 and 2. In this modified embodiment, all parts, such as the electric fuel pump 76, the fuel filter 78 and the accumulator 80 that are integrated into a fuel system for an Otto injection engine, are held jointly in the two connecting elements 82 of the suspension devices 72 and 74. For this purpose, the connecting elements 82 are plate-shaped and consist of a rubber-elastic material analogously to the described construction. For receiving each of the mentioned parts 76, 78, 80, these connecting elements are equipped with corresponding receiving openings 84, 86, 88, in which case at least the receiving openings of one of the connecting elements 82 may have one inner circumferental groove respectively which may be in form-fitting engagement with a corresponding ring-shaped outside bead of the corresponding fuel system part housing.

The two plate-shaped connecting elements 82 that are arranged inparallel to one another at a distance from one another, each have two hooking slots 90, 92 at a distance from one another in a joint horizontal plane at their upper section 82' (see FIG. 5). The hooking slots 90, 92 are in alignment with the hooking slots of the corresponding adjacent connecting element 82.

Clasp-shaped suspension members 94 and 96 are assigned respectively to each pair of aligned hooking slots, the end pieces 98 and 100 of these suspension members being preferably formed analogously to the hook-shaped anchoring parts 26' of the suspension members 26 of the embodiment of FIGS. 1-4.

In the case of this embodiment, the upper section 82' of the connecting elements 82, at least in the area of the suspension slots 90 and 92 and of the receiving openings 84, 86, 88, is developed to be very soft, which, on the one hand, is achieved by the selection of a suitable elastomer, advantageously rubber, and on the other hand, by the arrangement of sector-shaped slots 102, 104, 106 which are provided above the receiving openings 84, 86, 88.

In the case of this construction of FIGS. 5 and 6, it is advantageous, when the parts inserted into the connecting elements 82 are axially secured only at one connecting element, to connect the other one with this connecting element which may take place via a suitable securing pin 108 which, with both of its ends, may be held in one connecting element respectively, so that it can be engaged, for example.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. An elastic support arrangement for supporting a fuel system component at an underbody part of a motor vehicle, said support arrangement comprsiing:
   suspension member means fastenable to an underbody part of a motor vehicle and having a lowermost extremity,
   and one piece connecting member means supported by the suspension member means and being formed entirely of an elastomeric material, said elastomeric material exhibiting an opening for accommodating a fuel system component, said opening being dimensioned for fitting a housing of the fuel system component therein under elastic prestressing of the elastomeric material, with said opening being defined by a continuous, uninterrupted wall which closely surrounds the housing over the whole circumference of the housing when in an in-use assembled position,
   said connecting member means having a hooking slot means above said opening receiving said lowermost extremity of said suspension member means for providing said support,
   said connecting member means exhibiting a high elasticity between said opening and said hooking slot means.

2. An arrangement according to claim 1, wherein the connecting member means exhibits a high elasticity between the housing held at it and the suspension member means when in an in-use assembled condition.

3. An arrangement according to claim 1, wherein the connecting member means, at a section that can be suspended at the suspension member means, is penetrated by a slot-shaped elasticity increasing recess.

4. An arrangement according to claim 1 wherein said connecting member means includes two spaced apart disk shaped connecting member elements exhibiting respective openings for surrounding the housing when in an in-use assembled position.

5. An arrangement according to claim 4, wherein the suspension member means includes oppositely disposed anchoring parts fittably engageable in respective ones of the connecting member elements.

6. An arrangement according to claim 4, further comprising a protective cap held to the connecting member means by way of interengaging snap fitting parts at the cap and the connecting member means.

7. An arrangement according to claim 5, further comprising a protective cap held to the connecting member means by way of interengaging snap fitting parts at the cap and the connecting member means.

8. An arrangement according to claim 1, further comprising a protective cap held to the connecting member means by way of interengaging snap fitting parts at the cap and the connecting member means.

9. An arrangement according to claim 1, wherein said connecting member means includes two spaced apart plate shaped connecting member elements exhibiting a plurality of openings for accommodating the housings of a plurality of fuel system components.

10. An arrangement according to claim 9, wherein the plate shaped connecting member element are provided with anchoring recesses above the openings for engagement with anchoring parts of the suspension member means.

11. An arrangement according to claim 10, wherein the plate shaped connecting member elements are provided with slot-shaped elasticity increasing recesses above the respective openings for the housings.

12. An elastic support arrangement for supporting a fuel-system component of an underbody part of a motor vehicle, said support arrangement comprising:
   suspension member means fastenable to an underbody part of a motor vehicle,
   and connecting member means held at the suspension member means and inclduing rubber-elastic material, said rubber-elastic material exhibiting an opening for accommodating a fuel-system component, said opening being dimensioned for fitting a housing of the fuel-system component therein under elastic prestressing of the rubber-elastic material,
   wherein said connecting member means consists of said rubber-elastic material,
   wherein said connecting member means includes two spaced-apart disc-shaped connecting member elements exhibiting respective openings for surrounding the housing when in an in-use assembled position,
   further comprising a protective cap held to the connecting member means by way of interengaging snap fitting parts at the cap and the connecting member means.

13. An elastic support arrangement for supporting a fuel-system component of an underbody part of a motor vehicle, said support arrangement comprising:
   suspension member means fastenable to an underbody part of a motor vehicle,
   and connecting member means held at the suspension member means and including rubber-elastic material, said rubber-elastic material exhibiting an opening for accommodating a fuel-system component, said opening being dimensioned for fitting a housing of the fuel-system component therein under elastic prestressing of the rubber-elastic material,
   wherein said connecting member means includes two spaced apart disk-shaped connecting member elements exhibiting respective openings for surrounding the housing when in an in-use assembled position,
   wherein the suspension member means includes oppositely disposed anchoring parts fittably engageable in respective ones of the connecting member elements,
   further comprising a protective cap held to the connecting member means by way of inter-engaging snap-fitting parts at the cap and the connecting member means.

14. An elastic support arrangement for supporting a fuel-system component of an underbody part of a motor vehicle, said support arrangement comprising:
   suspension member means fastenable to an underbody part of a motor vehicle,
   and connecting member means held at the suspension member means and including rubber-elastic material, said rubber-elastic material exhibiting an opening for accommodating a fuel-system component, said opening being dimensioned for fitting a housing of the fuel-system component therein under elastic prestressing of the rubber-elastic material,
   wherein said connecting member means consists of said rubber-elastic material,
   further comprising a protective cap held to the connecting member means by way of inter-engaging snap-fitting parts at the cap and the connecting member means.

15. An elastic support arrangement for supporting a fuel-system component of an underbody part of a motor vehicle, said support arrangement comprising:
   suspension member means fastenable to an underbody part of a motor vehicle,
   and connecting member means held at the suspension member means and including rubber-elastic material, said rubber-elastic material exhibiting an opening for accommodating a fuel-system component, said opening being dimensioned for fitting a housing of the fuel-system component therein under elastic prestressing of the rubber-elastic material,
   wherein said connecting member means consists of said rubber-elastic material,
   wherein said connecting member means includes two spaced apart plate shaped connecting member elements exhibiting a plurality of openings for accommodating the housings of a plurality of fuel system components.

16. An arrangement according to claim 15, wherein the plate shaped connecting member elements are provided with anchoring recesses above the openings for engagement with anchoring parts of the suspension member means.

17. An arrangement according to claim 16, wherein the plate-shaped connecting member elements are provided with slot-shpaed elasticity increasing recesses above the respective openings for the housings.

* * * * *